United States Patent Office 3,253,905
Patented May 31, 1966

3,253,905
METHOD OF TREATING PLANTS
William L. Holmes, Rosemont, Pa., assignor to Smith Kline & French Laboratories, Philadelphia, Pa., a corporation of Pennsylvania
No Drawing. Filed Sept. 23, 1964, Ser. No. 398,732
9 Claims. (Cl. 71—2.7)

This application is a continuation-in-part of my copending application Serial Number 203,703, filed June 20, 1962, now abandoned.

This invention relates to a method of topically treating plants in order to interrupt vital anabolic cycles within the plant. More specifically the method of this invention deals with interrupting, usually reversibly, processes for synthesizing phytosterols essential for various plant functions.

While the exact plant isoprenoid cycles interrupted by this method are unknown, I have evidence to suggest that the isoprene pathway involved in the synthesis of phytosterols is interrupted at a stage subsequent to the cyclization of squalene. The steroids synthesized by this cycle are characterized by having a 3-hydroxylated or oxygenated 17-isooctane steroidal structure optionally substituted as known to the art, for example, by a 4-gem. dimethyl group such as in lanosterol, 4,4-dimethylcholesta-8,24-dien-3-one, 4,4-dimethylcholesta-8,24-dien-3β-ol, etc. (for more details see pages 578–581 of the "Biochemists' Handbook," 1961, or chapter 12, "Steroids," Fieser and Fieser).

The method of this invention is based on the fact that I have surprisingly found that phytosteroidal cycles within the plant may be interrupted by applying certain chemicals topically to the plant, especially to its foliage. The result of this inhibition is, depending on the plant species, a delay of flowering, dwarfing, defoliating or other effects on the normal growth of the plant. The chemical ingredients are aminoalkyl phosphates of the structural formula:

Formula 1

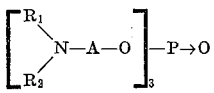

in which:

$R_1$ and $R_2$ are lower alkyl of from 1 to 8 carbon atoms inclusive or are taken together with the nitrogen atom a 5- or 6-membered heterocyclic group such as piperidinyl, pyrrolidinyl, morpholinyl, thiomorpholinyl, N-methyl-piperazinyl and the like; and
A represents a divalent straight or branched alkylene chain containing from 2 to 6 carbon atoms inclusively which separate the amine and oxygen functions by at least 2 carbon atoms.

Preferred are compounds in which $R_1$ and $R_2$ are methyl or ethyl and A is ethylene, propylene or isopropylene.

Also preferred are the nontoxic acid addition salts of these compounds such as those prepared from hydrochloric, sulfuric, hydrobromic, phosphoric, maleic, sulfamic, acetic, ethanedisulfonic, etc. The water soluble acid addition salts are preferred. These salts are generally prepared by dissolving the basic phosphate ester in ether, acetone or ethanol and adding an excess of the desired acid. The salt separates at once or is recovered by evaporation.

The basic phosphates used in my invention are prepared as known to the art by reacting an excess of the known alkanolamine with phosphorous oxychloride. Usually an excess of alkanolamine is used in an organic solvent such as benzene, xylene or toluene. After cooling, the mixture is quenched in water and taken into an immiscible organic solvent which is separated, dried and evaporated. A mixture of alkanolamines can be used in various molar proportions but usually the triester is prepared using the same alcohol.

The phosphate esters of Formula 1 are then applied to the surface of the plant usually in solution. If the base is used, a suitable non-phytotoxic organic solvent which will leave a residue of active ingredient on the plant surface such as kerosene, benzol, aqueous dimethylformamide or aqueous methanol is used. When the preferred water soluble acid addition salts are used, aqueous solutions are of advantage. For example, a soluble acid addition salt such as the hydrochloride is dissolved in water, adjusted to pH 7.2 and used at once. Administration at slightly basic pH's, over 7, inaqueous solution is preferred. Prolonged standing of aqueous solutions of these salts tends to hydrolyze the ester ingredients. Alternatively the active ingredient may be dispersed in solid fillers common to the art for use as dusting powders.

While, as noted above, the purpose of this invention is to use any method which deposits a residue of active ingredient on the surface of the plant sufficient to absorb an effective amount into the plant fluids, I have found that a practical concentration of the active phosphate esters in solution for application is from about $10^{-1}$ M to about $10^{-9}$ M. Usually about $10^{-2}$ M to about $10^{-5}$ M concentrations in aqueous solutions are used. Other specific useful concentrations will be disclosed hereafter. The preparations are then applied to the plant usually by spraying on or dipping the foliage or leaf to give a residue of the phosphate ingredient which is absorbed by the plant thereafter interrupting the vital isoprene cycles as described above. Alternatively for certain specific effects the basic phosphate esters may be applied to the root systems of the plants as by soil drench methods.

The utility of my method will be obvious to any phytologist. One of the most practical uses of my invention is for research purposes to investigate the biochemical cycles mediating biological responses in the plant. See for example Bonner et al., Plant Physiology, 38, 81 (1963). Other uses of this invention are to modify the various growing or flowering characteristics of plants when applied as described above.

The most surprising effect of this invention is its use to control flowering. In concentrations of about 1–2 mg./ml. at pH 7.2 applied to the foliage of certain short day plants particularly the cocklebur (Zanthium) or the Japanese morning glory (Pharbitis) the flowering of the plant is reversibly delayed. This inhibition is due to the control of the photoperiod of the plant by interrupting its biosynthetic steroidal cycles temporarily apparently thereby controlling the production of the flowering hormonal agent(s). The period of application is any time up to eight hours before the induction period but is most effective during the four hours immediately before said period. The other normal characteristics of the plants are not altered. When the phosphate esters are applied to the roots of such plants as those mentioned above plus the sunflower a strong general growth inhibition was noted. Root application to pimento and Pharbitis (as low as 4 mg. per plant) causes a dwarfing of the plants. Some stunting of tomatoes and lamb's-quarter is observed by spray application. In cucumbers inhibition of leaf and stem growth is noted but more interestingly the development of the female flower is delayed but not the male. Inhibition of begonia Evansiana tuberization is demonstrated at 300 and 1000 p.p.m. concentration spray using diethylaminoethylphosphate hydrochloride. Strawberries tolerate concentrations up to 2000 p.p.m. of this agent with promotion of flower stalk and fruiting reported. This method of this invention may also be of use in fruit thinning in apples since old leaves seem to be killed more rapidly than new.

It is apparent therefore that the methods and composition of my invention are of use in controlling both the growth and flowering of various plants. These effects are not general toxic effects on the plants as previous agents seem to cause but are due to specific and reversible inhibition of anabolic cycles within the plant.

I have presented the preferred ranges of these applications herebefore but my invention obviously is much broader than these limited, although useful applications.

The preferred compounds of my invention are tri(dimethylaminoethyl)-phosphate and tri-(diethylaminoethyl)-phosphate and their water soluble acid addition salts.

The general method of synthesis of the phosphate ester ingredients of this invention is well known to the art and is illustrated hereafter:

A solution of 1376 g. of β-dimethylaminoethanol in 6 liters of dry toluene is stirred and cooled as 396 g. of phosphorous oxychloride is added. The rate of addition is so regulated that the reaction temperature remains at 0 to 10° C. This addition requires about three hours. After the addition is completed, the cooling bath is removed. The solution is stirred at room temperature for about three hours and is allowed to stand overnight. The resulting mixture is cooled to 20° C. and 800 mls. of water is added with stirring. The upper organic layer is separated and concentrated in vacuo at a temperature of 50° C. The resultant base as a viscous liquid is taken up in 3 liters of ethanol and made acidic with 1300 g. of 10% isopropanolic hydrogen chloride. The crystalline solid separates on cooling and recrystallized from 8.5 liters of hot ethanol. The melting point of the resultant tri-(dimethylaminoethyl)-phosphate trihydrochloride is 169–170° C.

The other congeners of this compound are prepared by substituting molar equivalents of the alkanolamine moiety herein.

What is claimed is:

1. The method of controlling the flowering of plants which comprises applying to the foliage of said plants in an amount sufficient to control flowering a member selected from the group consisting of a tri-(aminoalkyl)-phosphate and its nontoxic acid addition salts, said phosphate being of the formula:

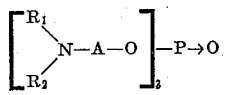

in which:

$R_1$ and $R_2$ are members selected from the group consisting of lower alkyl of from 1 to 8 carbon atoms and, when taken together, pyrrolidinyl, piperidinyl, morpholinyl, thiomorpholinyl and N-methylpiperazinyl; and A is an alkylene chain of from 2 to 6 carbon atoms.

2. The method of claim 1 in which the tri-(aminoalkyl)-phosphate is tri-(diethylaminoethyl)-phosphate hydrochloride.

3. The method of claim 2 in which the concentration of phosphate is from about $10^{-2}$ M to about $10^{-5}$ M.

4. The method of claim 1 in which the tri-(aminoalkyl)-phosphate is tri-(dimethylaminoethyl)-phosphate hydrochloride.

5. The method of claim 4, in which the concentration of phosphate is from about $10^{-2}$ M to about $10^{-5}$ M.

6. The method of inhibiting the growth of plants which comprises applying topically to said plants in an amount sufficient to inhibit plant growth, a member selected from the group consisting of a tri-(aminoalkyl)-phosphate and its nontoxic acid addition salts said phosphate being of the formula:

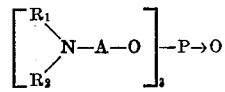

in which:

$R_1$ and $R_2$ are members selected from the group consisting of lower alkyl of from 1 to 8 carbon atoms and, when taken together, pyrrolidinyl, piperidinyl, morpholinyl, thiomorpholinyl and N-methylpiperazinyl; and A is an alkylene chain of from 2 to 6 carbon atoms.

7. The method of claim 6 in which the phosphate is tri-(diethylaminoethyl)-phosphate.

8. The method of claim 6 in which the phosphate is tri-(dimethylaminoethyl)-phosphate.

9. The method of claim 6 in which the phosphate is applied in the form of an aqueous solution of said phosphate at a concentration of from about $10^{-2}$ to about $10^{-5}$ M at a basic pH.

References Cited by the Examiner

UNITED STATES PATENTS

| | | | |
|---|---|---|---|
| 3,020,141 | 2/1962 | Hamm et al. | 71—2.5 X |
| 3,073,740 | 1/1963 | Greenberg et al. | 260—461 |
| 3,074,993 | 1/1963 | Tolkmith | 71—2.7 X |

LEWIS GOTTS, *Primary Examiner.*

JULIAN S. LEVITT, *Examiner.*